United States Patent
Coffey et al.

(10) Patent No.: US 11,641,402 B2
(45) Date of Patent: *May 2, 2023

(54) SYSTEMS AND METHODS FOR MANAGED CONNECTIVITY WALL OUTLETS USING LOW ENERGY WIRELESS COMMUNICATION

(71) Applicant: CommScope Technologies LLC, Hickory, NC (US)

(72) Inventors: Joseph C. Coffey, Burnsville, MN (US); Joseph Polland, Eden Prairie, MN (US); Jason Bautista, Mayer, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,783

(22) Filed: May 10, 2022

(65) Prior Publication Data
US 2022/0272155 A1  Aug. 25, 2022

Related U.S. Application Data

(63) Continuation of application No. 16/620,736, filed as application No. PCT/US2018/039853 on Jun. 27, 2018, now Pat. No. 11,388,240.
(Continued)

(51) Int. Cl.
*H04L 67/125* (2022.01)
*H02J 13/00* (2006.01)
*H05B 45/30* (2020.01)

(52) U.S. Cl.
CPC ...... *H04L 67/125* (2013.01); *H02J 13/00022* (2020.01); *H05B 45/30* (2020.01)

(58) Field of Classification Search
CPC ... H04L 67/125; H04L 12/2809; H04L 12/10; H02J 13/00022; H05B 45/30; Y02B 90/20; Y04S 40/126
See application file for complete search history.

(56) References Cited

U.S. PATENT DOCUMENTS

| 9,824,474 B2 | 11/2017 | Smith et al. |
| 2014/0182876 A1 | 7/2014 | Trojanowski |
| 2014/0330511 A1 | 11/2014 | Tison et al. |
| 2014/0330551 A1 | 11/2014 | Bao et al. |

(Continued)

FOREIGN PATENT DOCUMENTS

| CN | 102932062 A | 2/2013 |
| CN | 103543700 A | 1/2014 |

(Continued)

OTHER PUBLICATIONS

Lee, Pie-Yuan,et al., "Augmented Reality Techniques for Spinal Surgery Applications", iRCAD Taiwan, DATE, pp. 1 through 1, Published: CN.

(Continued)

*Primary Examiner* — Nicholas R Taylor
*Assistant Examiner* — Tania M Pena-Santana
(74) *Attorney, Agent, or Firm* — Fogg & Powers LLC

(57) ABSTRACT

A system providing connectivity management is provided. The system comprises: a content management server configured to manage connectivity for a network; one or more central controllers configured to collect connectivity information for at least a portion of the network for use by the content management server; and at least one outlet having one or more ports for receiving one or more plugs, wherein connectivity information is communicated between the outlet and the central controller through one or more wireless communication interface.

23 Claims, 12 Drawing Sheets

Related U.S. Application Data

(60) Provisional application No. 62/526,176, filed on Jun. 28, 2017.

(56) References Cited

U.S. PATENT DOCUMENTS

| | | | |
|---|---|---|---|
| 2015/0193982 A1* | 7/2015 | Mihelich | H04W 4/026 345/633 |
| 2016/0071319 A1* | 3/2016 | Fallon | G09G 5/003 345/633 |
| 2016/0224500 A1 | 8/2016 | Pinn et al. | |
| 2017/0018274 A1 | 1/2017 | German et al. | |
| 2017/0076504 A1* | 3/2017 | Oar | H04L 43/0811 |
| 2017/0132841 A1* | 5/2017 | Morrison | G06V 20/20 |
| 2018/0006492 A1 | 1/2018 | Kim et al. | |
| 2019/0006492 A1* | 1/2019 | Wang | H01L 21/266 |
| 2019/0041637 A1 | 2/2019 | German et al. | |
| 2020/0145495 A1 | 5/2020 | Coffey et al. | |
| 2020/0331155 A1* | 10/2020 | Vu | F16P 3/147 |
| 2020/0401209 A1* | 12/2020 | Boss | G06F 3/011 |

FOREIGN PATENT DOCUMENTS

| | | |
|---|---|---|
| CN | 103945285 A | 7/2014 |
| CN | 106507083 A | 3/2017 |
| CN | 110800260 A | 2/2020 |
| EP | 3646574 A1 | 5/2020 |
| WO | 2016025998 A1 | 2/2016 |
| WO | 2016111604 A1 | 7/2016 |
| WO | 2019006026 A1 | 1/2019 |
| WO | 2019028418 A1 | 2/2019 |

OTHER PUBLICATIONS

Bin, Jiang et al., "A Study on Network Videoconferencing System Base on Augmented Reality", U.S. Appl. No. 16/620,736, filed Jan. 10, 2006, pp. 1 through 4, Published: CN.

China National Intellectual Property Administration, "First Office Action from CN Application No. 201880043277.9", from Foreign Counterpart to U.S. Appl. No. 16/620,736, filed Apr. 6, 2021, pp. 1 through 9, Published: CN.

China National Intellectual Property Office, "Notification of Second Office Action" from CN Application No. 201880043277.9 dated Oct. 21, 2021, from Foreign Counterpart to U.S. Appl. No. 16/620,736, Dec. 9, 2019, pp. 1-15, Published: CN.

Deffeyes "Mobile Augmented Reality in the Data Center", IBM J. Res. & Dev. Paper 5, Sep./Oct. 2011, pp. 1 through 5, vol. 55, No. 5, IBM.

European Patent Office, "Communication Pursuant to Article 94(3) EPC from EP Application No. 18824604.5", from Foreign Counterpart to U.S. Appl. No. 16/620,736, filed Jan. 14, 2022, pp. 1 through 4, Published: EP.

European Patent Office, "Extended European Search Report from EP Application No. 18824604.5", from Foreign Counterpart to U.S. Appl. No. 16/620,736, filed Feb. 10, 2021, pp. 1 through 8, Published: EP.

International Bureau, "International Preliminary Report on Patentability from PCT Application No. PCT/US2018/039853", from Foreign Counterpart to U.S. Appl. No. 16/620,736, filed Jan. 9, 2020, pp. 1-12, Published: WO.

International Searching Authority, "International Search Report and Written Opinion from PCT Application No. PCT/US2018/039853", dated Oct. 19, 2018, pp. 1-15, Published: WO.

U.S. Patent and Trademark Office, "Notice of Allowance", U.S. Appl. No. 16/620,736, filed Mar. 23, 2022, pp. 1 through 26, Published: US.

U.S. Patent and Trademark Office, "Office Action", U.S. Appl. No. 16/620,736, filed Jul. 21, 2021, pp. 1 through 39, Published: US.

European Patent Office, "Communication pursuant to Article 94(3)", from EP Application No. 18824604.5, from Foreign Counterpart to U.S. Appl. No. 16/620,736, dated Mar. 6, 2023, pp. 1-5, Published: EP.

* cited by examiner

SYSTEMS AND METHODS FOR MANAGED CONNECTIVITY WALL OUTLETS USING LOW ENERGY WIRELESS COMMUNICATION

CROSS-REFERENCE TO RELATED APPLICATIONS

The present application is a continuation of U.S. patent application Ser. No. 16/620,736 filed on Dec. 9, 2019, which claims priority to International Patent Application No. PCT/US2018/039853 filed Jun. 27, 2018, which claims benefit of U.S. Patent Application Ser. No. 62/526,176, filed Jun. 28, 2017; the entire contents of the aforementioned patent applications are incorporated herein by reference as if set forth in their entirety.

BACKGROUND

Managed connectivity is an important technology for data centers where optical fiber and wire connectivity is used to interconnect high bandwidth ports between network elements such as servers, switches, and routers to other network elements. As data centers have grown larger and become more security conscious and more geographically diverse, the need for connectivity identification, near real time detection and self-documentation, are becoming compulsory requirements.

In certain systems, a managed connectivity system may provide connectivity information regarding wall outlets or other similar devices. The connectivity information acquired from the wall outlets may be provided to an upstream controller such as a middleware or database system. The connectivity information may be used in conjunction with connectivity information acquired from other parts of a network to create a map of the network. To acquire information regarding the wall outlets, a wall outlet would include an Ethernet switch. Through the Ethernet switch, a single cable may be used for communications, power, along with providing a communicative path for the acquisition of connectivity information regarding the outlet. However, the implementation of an Ethernet switch and the connecting of cables to the Ethernet switches may be expensive while requiring considerable power to operate.

SUMMARY

A system providing connectivity management is provided. The system comprises: a content management server configured to manage connectivity for a network; one or more central controllers configured to collect connectivity information for at least a portion of the network for use by the content management server; and at least one outlet having one or more ports for receiving one or more plugs, wherein connectivity information is communicated between the outlet and the central controller through one or more wireless communication interface.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
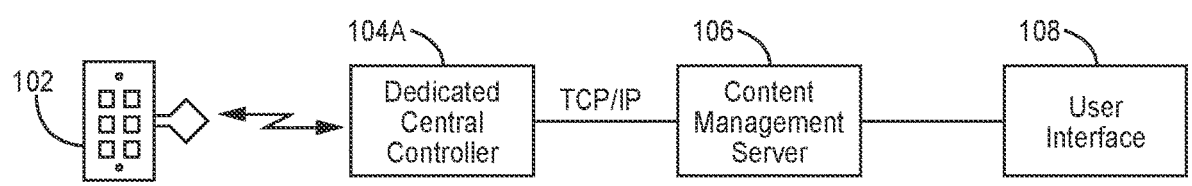
FIGS. 1A and 1B are block diagrams illustrating exemplary embodiments of outlets communicating through a low energy wireless interface to provide connectivity information.

In accordance with common practice, the various described features are not drawn to scale but are drawn to emphasize specific features relevant to the exemplary embodiments.

DETAILED DESCRIPTION

In the exemplary embodiments described herein, systems and methods for managed connectivity using personal local area networks are provided. For example, low energy wireless technology and other wireless communication technologies used for personal local area networks may be implemented in managed connectivity systems. In certain implementations, the low energy wireless technology provides both small size and lower power consumption. Due to the small size and lower power consumption, the systems and methods that are used to access identification data used to manage the connections in a system can be moved from an outlet into plugs that are connected into ports in the outlet.

In certain embodiments, low energy wireless technology may be used to provide connection information about wall outlets or similar devices. For example, outlets, equipped with low energy wireless technology, may communicate connection information to a central controller. Outlets, as described herein, may include contacts that are capable of reading memory devices on plugs connected thereto. For example, an outlet may include connection point identification (CPID) style contacts that are capable of reading memory devices in a CPID patch cord. In at least one implementation, to enable communications with the central controller and provide a microcontroller for the detecting the insertion of connectors (e.g. of cables) into a receptacle (e.g. a port) of a wall outlet, the wall outlet may also include a System-On-Chip (SoC). The SoC may contain a low energy wireless radio through which the SoC communicates connection information to the central controller. Further, the outlet may acquire power through a battery (such as a coin cell type battery), by harvesting power from local energy sources, or through power over Ethernet (PoE).

In at least one implementations, a central controller may function as a bridge between the low energy wireless technology implemented in the outlet and a TCP/IP interface using Ethernet. When the central controller acts as the bridge between the different technologies, the central controller may send connection information to a central content management system or server. In certain implementations, the central content management system or server also functions as the central controller and is able to communicate directly with the outlets while functioning as the central content server. Further, a central control may be able to serve as an IEEE802.11 compliant WiFi Access Point to provide connectivity for devices such as a wireless printer or other mobile devices.

In certain embodiments, the central controller may be a single dedicated central controller that receives connection information from the SoCs of multiple wall outlets. When the central controller receives information from multiple wall outlets, the central controller may employ a location service to help with load balancing so that the central controller is not overwhelmed from communications being transmitted all at once. For example, the central controller may monitor the received signal strength indications (RSSI) for the multiple wall outlets; the central controller may use other location services as well. Based on the location information of the wall outlets, the central controller may handle information received from different subsets of the wall outlets at different times.

In an alternative implementation, the central controller may be virtualized in a workstation PC, where the central controller runs as a task in the background to communicate connection information received from an outlet to a content management system. In such an implementation, a local personal computer (PC) in an area near the wall outlet may function as a central controller while not functioning as a dedicated central device. Thus, a subset of PCs in an area may be assigned to function as central controllers and gather information from the wall outlets and provide the information to the content management server through a TCP/IP connection.

In at least one implementation, at initialization time, central controllers (be they local dedicated controllers or virtualized central controllers executing on PCs) may collect signal and other device information for wall outlets that are visible to the central controllers. For example, the central controllers may collect information such as signal strength, error rate, delay, and other device information. The central controllers then may pass the information on to the content management server. The content management server may use the information to pair central controllers with certain wall outlets. For example, the central management system may pair central controllers with wall outlets based on signal strength. That is, a wall outlet may be paired with the central controller that receives the wall outlet's signal at the highest signal strength.

In an alternative embodiment, the content management server may pair wall outlets and central controllers based on lowest error rates, whether wall outlets support certain communication protocol version numbers, along with other options. In certain alternative embodiments, the content management server may associate central controllers with wall outlets in order to balance the load of wall outlets serviced by the different central controllers. For example, when a first central controller is able to communicate with twenty wall outlets and a second central controller is able to communicate with ten wall outlets and five of the wall outlets can communicate with both the first and second central controller, the content management server will associate the five common wall outlets with the second central controller such that fifteen wall outlets are assigned to the first central controller and ten wall outlets are assigned to the second central controller. Further, other devices such as energy controls and sensors may also communicate with central controllers to send/receive information from a controller to the contact management system. Through these embodiments described above and below, wall outlets are able to provide connection information to a content management server.

Figure 1B:
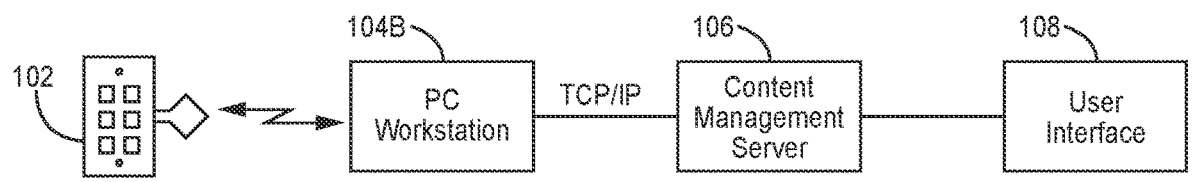

FIGS. 1A and 1B illustrate different implementations for acquiring connection information from wall outlets 102 equipped with low energy wireless technology to a content management server 106. As illustrated in FIG. 1A, a wall outlet 102 may be equipped with a low energy wireless technology, through which the wall outlet 102 may communicate with other devices. For example, the wall outlet 102 may be able to communicate through technologies that may include Bluetooth, Bluetooth low energy (BLE), Zigbee, or other personal area network technology. The wall outlet 102 may connect to a central controller 104 through the low energy wireless technology.

In certain implementations, the central controller 104 may be a dedicated central controller 104A that receives connection information from the wall outlet 102. When the central controller receives information from the wall outlet, the central controller may communicate through a TCP/IP interface to communicate the connection information to a content management server 106. The content management server 106 then may provide the information to a user through a user interface 108. Also, the content management server 106 may communicate through the dedicated central controller 104A with the wall outlet 102. For example, the central controller 104 may communicate to a wall outlet 102 having a unique address such as an IEEE802 compliant MAC address, a randomly generated link layer address, a periodically changing random address with device pairing for privacy, an address derived from identifiers for at least one of the outlet and plugs connected therein, and the like. Alternatively, the central controller 104 may be virtualized in a PC workstation 104B, where the central controller 104 runs as a task in the background to communicate connection information received from an outlet to a content management system. In such an implementation, a local personal computer (PC) in an area near the wall outlet may function as a central controller while not functioning as a dedicated central device. Thus, a subset of PCs in an area may be assigned to function as central controllers and gather information from the wall outlets and provide the information to the content management server through a TCP/IP connection.

Figure 2:
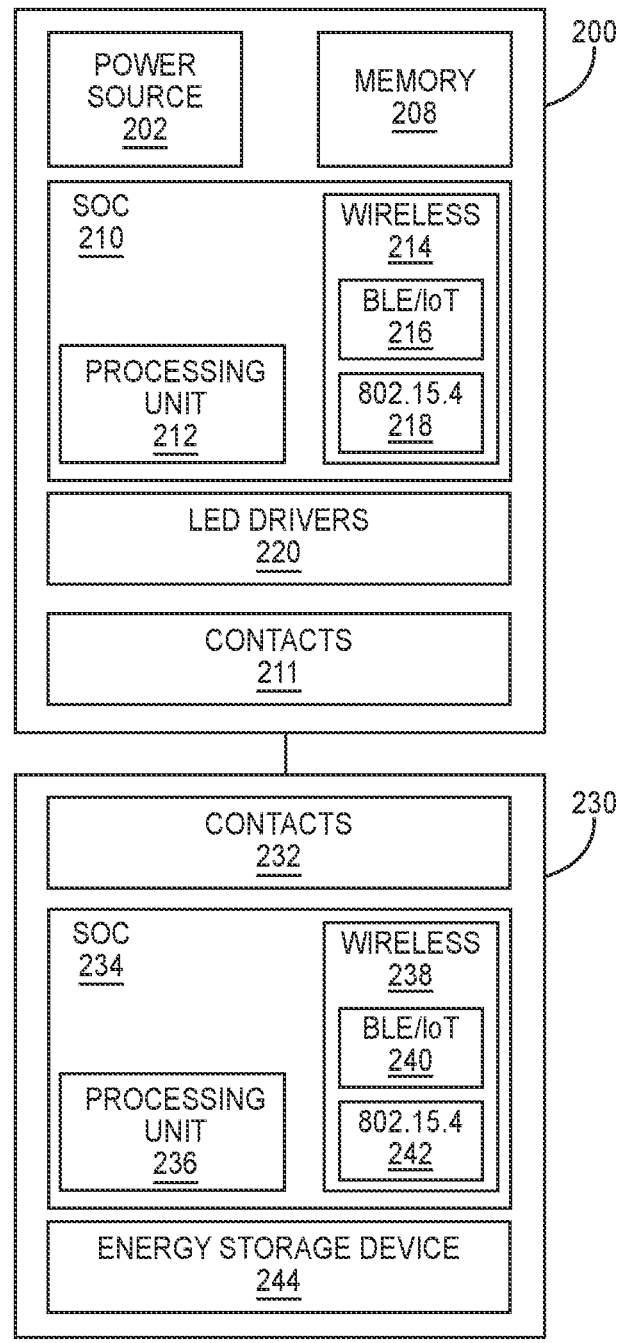
FIG. 2 is a block diagram illustrating an exemplary embodiment of an outlet microcontroller connected to a plug.

FIG. 2 is a block diagram illustrating a control stack for a wall outlet microcontroller 200 and one implementation of a plug for insertion into the wall outlet. In certain implementations, the outlet microcontroller 200 receives power through power source 202. Power source 202 may provide power to the outlet microcontroller 200 through a battery (such as a coin cell or other type of battery), power over Ethernet (PoE), or by adapting power received through a mains power as understood by those having skill in the art. The outlet microcontroller 200 uses the provided power to drive the several components in the outlet microcontroller 200.

The outlet microcontroller 200 further includes a memory 208. In at least one implementation, the memory 208 may be a static memory (such as an I2C or single wire EEPROM or Flash memory), however other types of memory (e.g. dynamic random access memory) may be used. The memory 208 may store information describing the outlet 200. For example, the memory 208 may store a identifier, type of outlet/model number, serial number, number of ports, vendor, manufacture date, manufacture plant, possible location, among other information that may be helpful to a user monitoring the wall outlet 200. In at least one implementation, the information in the memory 208 may be transmitted to a central controller over a wireless network during the initialization of the connection of the wall outlet 200 to a central controller. Further, the information in the memory 208 may be broadcast periodically by the wall outlet 200 through a wireless communication interface 214. Alternatively, the information in the memory 208 may be transmitted by the outlet processor 204 through the wireless communication interface 214 to a specific address of the central controller upon reception of a request from the central controller.

In a further implementation, the outlet microcontroller 200 may include a system on chip (SOC) 210. The SOC 210 includes a processing unit 212 and a wireless communication interface 214. The processing unit 212 may be a basic processor. Alternatively, the processing unit 212 may be a specialized processor or other type of processing unit. Further, the SOC 210 may include a PAN or wireless communication interface 214. The SOC 210 may communicate with a central controller through the wireless communication interface (or system) 214. In certain implementations, the wireless communication interface 214 is capable of communicating through a variety of wireless standards such as a BLE/IoT wireless interface 216 or an IEEE802.15.4 compliant interface 218. Also, the wireless communication interface 214 may communicate through other wireless communication interface suitable for implementation in personal area networks. The wireless communication interface 214 may also communicate according to other wireless standards known to one having skill in the art. The processing unit 212 may be a microprocessor, microcontroller, digital signal processor, application specific integrated circuit, gate array and/or any other device capable of providing the desired processing.

In certain embodiments, as part of these communications received through the wireless communication interface 214 from the central controller, the processing unit 212 processes commands received from the central controller that instruct the processing unit 212 how to control the outlet LEDs through LED drivers 220. The LED drivers 220 use the power received through the power source 202 to drive any outlet LEDs. Accordingly, when a connector plug is inserted into a port in the outlet, the connector plug may transmit a message to the central collector through the wireless interface 214 indicating that a particular port in the outlet has a connection. The outlet microcontroller 200 may then receive a message from the central controller dictating how the outlet microcontroller 200 should drive the LED associated with the connected port to correctly represent the status of the associated connected outlet port. The outlet microcontroller 200 then sends signals to the LED drivers 220 to correctly drive LEDs as desired. For example, the LEDs may be driven such that they are turned on or off, have the color change, flash according to a specific cadence, or other desired LED behaviour as directed by a content management server.

In at least one implementation, for example, when the outlet receives power through PoE, a personal area network (PAN) interface (or system) of a connector inserted into a receptacle of an outlet may be powered by the PoE; this facilitates the PAN interface of the connector to communicate, e.g. with the PAN interface of the outlet or of a dedicated central controller 104A. Further, as power is provided by the PoE, the monitoring of the insertion or removal of connector plugs from an outlet port may be reliant on the power that is provided by the outlet to the connector. In the event that the outlet loses power, the connector plugs that are inserted into the outlet ports may determine that they have experienced a removal event, where a removal event is the determination that a connecter plug has been removed from their associated port due to the loss of power provided to the connector plugs through the outlet. When the connector plugs determine that a removal event has occurred, the connector plugs may transmit a removal message to the central collector. Conversely, when the outlet power is restored, the restoration of power to the outlet and through the outlet to the connector plugs inserted into the ports may cause the connector plugs to determine that an insertion has occurred. Upon detecting the restoration of power as an insertion event, the connector plugs may transmit an insertion message to the collection device.

When outlets receive their power from connectors or mains power, the outlets may be subject to power events, such as the loss of power to the outlet and a subsequent restoration of power to the outlet. These power events may result in the transmission of false insertion and removal messages, e.g. as illustrated above. In a high density system having multiple outlets, a power event may result in the transmission of large numbers of spurious insertion and removal events due to the simultaneous loss and restoration of power at the different outlets in the system. As such, a large number of connectors may simultaneously transmit removal or insertion messages, which may lead to congestion in the wireless network and inaccurate connection status in the management system. In certain implementations, to prevent congestion from occurring, the outlet may also be equipped with an energy storage unit such as a super capacitor or battery to keep the outlet powered up for a limited period of time.

FIG. 2 further illustrates one possible implementation of a connector (or connector plug) 230 that could be coupled into a port in the wall outlet controlled by outlet microcontroller 200. A connector 230 may terminate a cable used as a physical medium for the transmission of information. For example, the connector plug 230 may couple to an optical fiber, coaxial cable, CAT-5 cable, CAT6A cable, CAT7 cable, CAT8 cable, or other cable that is able to function as a physical medium for the transmission of data. An outlet port may include contacts 211 for connecting to a connector plug 230. The contacts 232 may be capable of coupling power and data between the connector plug 230 and the outlet microcontroller 200. For example, the connector plug 230 may be coupled to the outlet 200 through the contacts 211 such that information and possibly power are communicated between the outlet microcontroller 200 and the connector plug 230.

In certain embodiments, the connector plug 230 is able to communicate physical layer information or information that can be used for managing the connectivity of a system through a wireless communication interface 238. The wireless communication link 238 may communicate connectivity information to a central controller, which central controller may be a dedicated central controller or a PC or other computational device executing central controller software. In certain implementations, the connector plug 230 includes contacts 232 that couple with the contacts 211 of the outlet microcontroller 200 to receive or provide data and power from/to the outlet microcontroller 200.

In exemplary implementations, the connector plug 230 includes a system on chip (SOC) 234. The SOC 234 includes a processing unit 236 and a wireless communication interface 238. The wireless communication interface 238 may include a BLE/IOT communication interface 240, an IEEE802.15.4 compliant communication interface 242, or other wireless communication interface. As illustrated, the wireless communication interface 238 shows the BLE/IOT communication interface 240 and an IEEE802.15.4 compliant communication interface 242. In addition to the illustrated communication interfaces, the wireless communication interface 238 may include communication interfaces for communicating according to other wireless communication standards known to one having skill in the art beyond what is illustrated in FIG. 2. In certain implementations, upon inserting the connector plug 230 into the outlet port, the connector plug 230 may obtain electrical power from the outlet 200. The SOC 234 may then detect the presence of power as an insertion event and begins to read the memory 208 associated with the outlet 200. Once the SOC 234 reads the information from the memory 208, the SOC 234 may format a message and send the connectivity information to the central collector via the wireless communication interface 238. When the plug is removed, the SOC 234 detects the loss of power and sends a disconnect message to the management workstation or aggregation device. To provide power for transmission of the disconnect message, the connector plug 230 may include an energy storage device 244 such as a battery or a capacitor. The energy storage device 244 may be charged by power received from the outlet port 200. The energy storage device 244 may store enough energy to keep the SOC 234 operational for a period of time after removal from the outlet.

In certain implementations, the connector plug 230 may also include a memory device similar to the memory 208 in the outlet port. When the cable connector plug 230 is inserted in an outlet port, the SOC 234 receives power and initializes. During initialization, the SOC 234 may read information from the memory device in the connector plug 230. The information stored in the memory device may include cable identification, cable subID, category, rating, polarity, color, length, insert count, country of manufacture, serial number, catalogue number, date of manufacture, manufacturer identification, plant identification, software version, hardware version, and other information that may be useful for managing the connectivity of the cable. The SOC 234 may then read information in the memory 208 to obtain port information. In certain implementation, the combination of the connector plug information and the outlet port information may be immediately broadcast through the wireless communication interface 238 over a network as an insertion event. Alternatively, the information may be transmitted periodically, or transmitted in response to a query by a central controller. When the connector plug 230 is removed from the port plug 200, the connector plug 230 may remain active for a period of time, during which period of time, the connector plug 230 may issue a disconnect event, where the disconnect event indicates a port identification, cable identification, and a cable subID associated with the disconnection. Further, the connector plug 230 may include a barcode to facilitate the physical identification of the connector plug. In an alternative implementation, the connector may include a memory device that is read by the SOC 210, upon insertion of the connector into a port in the outlet. The memory may store information as described above.

Figure 3:
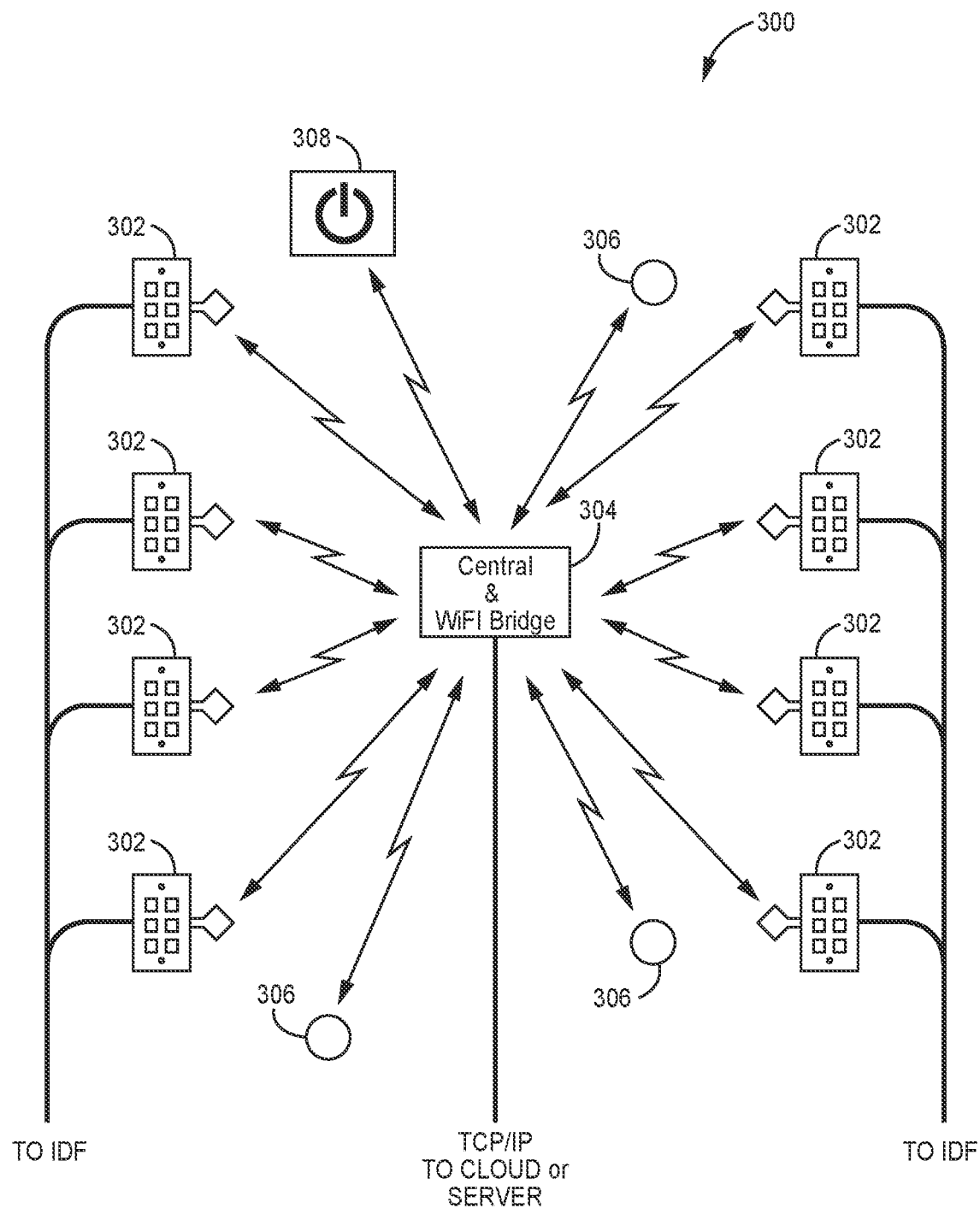
FIG. 3 is a diagram illustrating an exemplary embodiment of multiple outlets in communication with a single central controller through low energy wireless interfaces.

FIG. 3 is a diagram illustrating a network 300 having multiple outlets 302 in communication with a central controller 304. As shown, the outlets 302 function substantially similar to the outlets described above with respect to FIGS. 1 and 2. As shown, the outlets 302 are in communication with an intermediate distribution frame (IDF). As described above, a central controller 304 may function as a bridge between the low energy wireless technology implemented in the outlets 302 and a TCP/IP interface using Ethernet. When the central controller 304 acts as the bridge between the different technologies, the central controller 304 may send connection information to a central content management system or server. Such a server may be, but does not have to be, implemented with Cloud computing system (a Cloud). In certain implementations, the central content management system or server also functions as the central controller 304 and is able to communicate directly with the outlets 302 while functioning as the central content server. Further, a central controller 304 may be able to serve as an 802.11 WiFi Access Point to provide connectivity for devices such as a wireless printer or other mobile devices. For example, as illustrated, the central controller 304 is able to communicate with sensors 306 and power/lighting control 308.

In certain embodiments, the central controller 304 may be a single dedicated central controller that receives connection information from the SoCs of multiple wall outlets 302. When the central controller receives information from multiple wall outlets, the central controller 304 may employ a location service to help with load balancing so that the central controller is not overwhelmed from communications being transmitted all at once. For example, the central controller 304 may monitor the received signal strength indications (RSSI) for the multiple wall outlets 302, the central controller may use other location services as well. Based on the location information of the wall outlets 302, the central controller 304 may handle information received from different subsets of the wall outlets 302 at different times.

Figure 4:
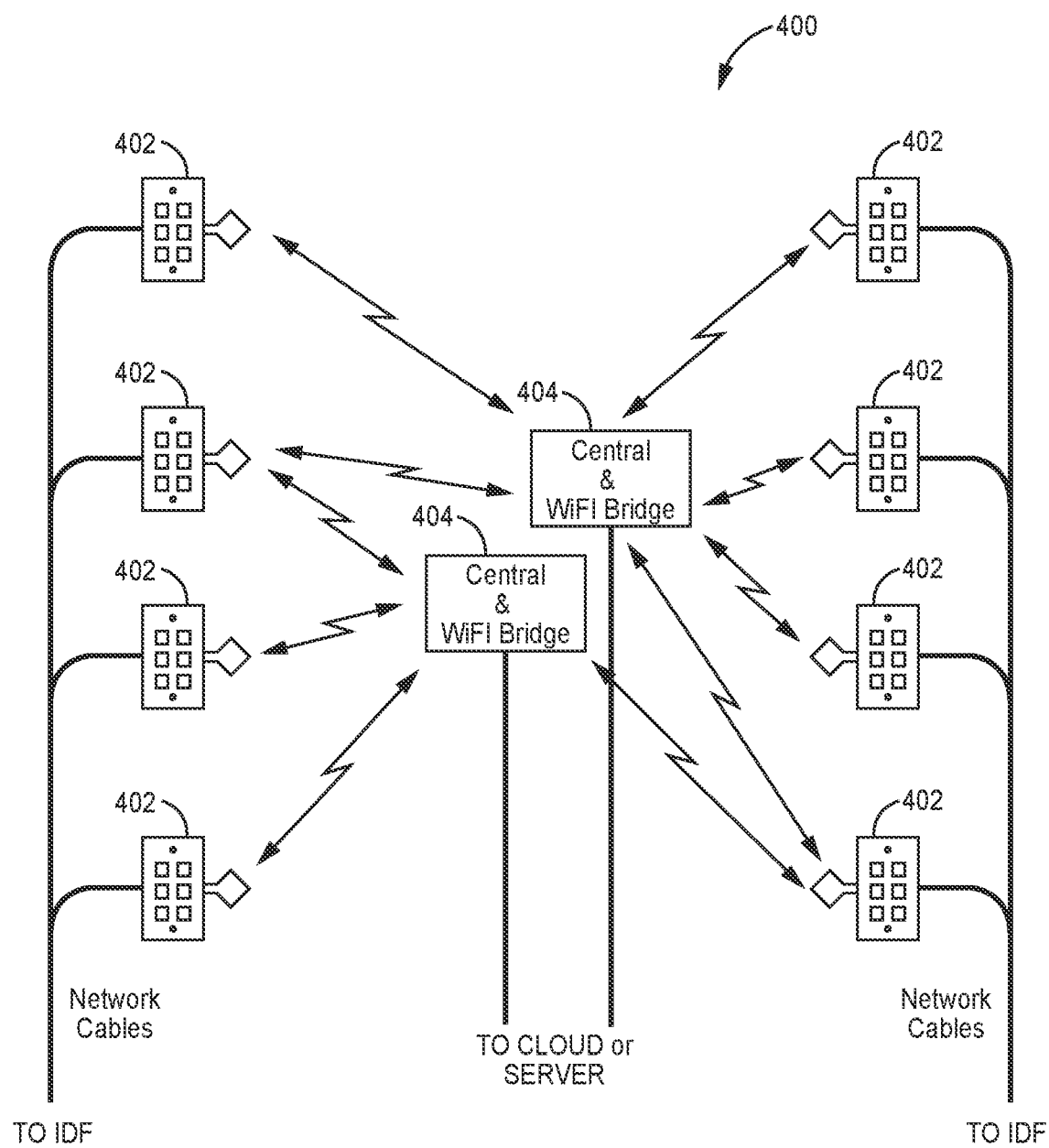
FIG. 4 is a diagram illustrating an exemplary embodiment of multiple outlets in communication with multiple central controllers through low energy wireless interfaces.

FIG. 4 is a drawing illustrating a network 400 having multiple outlets 402 in communication with multiple central controllers 404 In at least one implementation, at initialization time, central controllers 404 (be they local dedicated controllers or virtualized central controllers executing on PCs) may collect signal and other device information for the wall outlets 402 that are visible to the central controllers 404. For example, the central controllers 404 may collect information such as signal strength, error rate, delay, and other device information as described above. The central controllers 404 then may pass the information on to a content management server. The content management server may use the information to pair central controllers 404 with certain wall outlets 402. For example, the central management system may pair central controllers 404 with wall outlets based on signal strength. That is, a wall outlet 402 may be paired with the central controller 404 that receives the wall outlet's signal at the highest signal strength. Alternatively, the central controllers 404 may be paired with wall outlets 402 based on the location of the outlets 402 in relation to the respective central controllers 404.

In an alternative embodiment, a content management server may pair wall outlets 402 and central controllers 404 based on lowest error rates, whether wall outlets 404 support certain communication protocol version numbers, along with other options. In certain alternative embodiments, a content management server may associate central controllers 404 with wall outlets 402 in order to balance the load of wall outlets 402 serviced by the different central controllers 404. For example, as illustrated, a first central controller 404 in the central controllers 404 is able to communicate with six of the eight wall outlets 402 and a second central controller 404 in the central controllers 402 is able to communicate with four of the eight wall outlets 402. As illustrated, two of the wall outlets 402 are in communication with both the first and second central controllers 404. In order to balance the load of the different central controllers 404, a content management server may assign the two wall outlets that are in communication with both the first and second central controllers 404 to communicate with the second central controller 404. As such, both the first and second central controllers 404 are then each in communication with four outlets 402.

Figure 5:
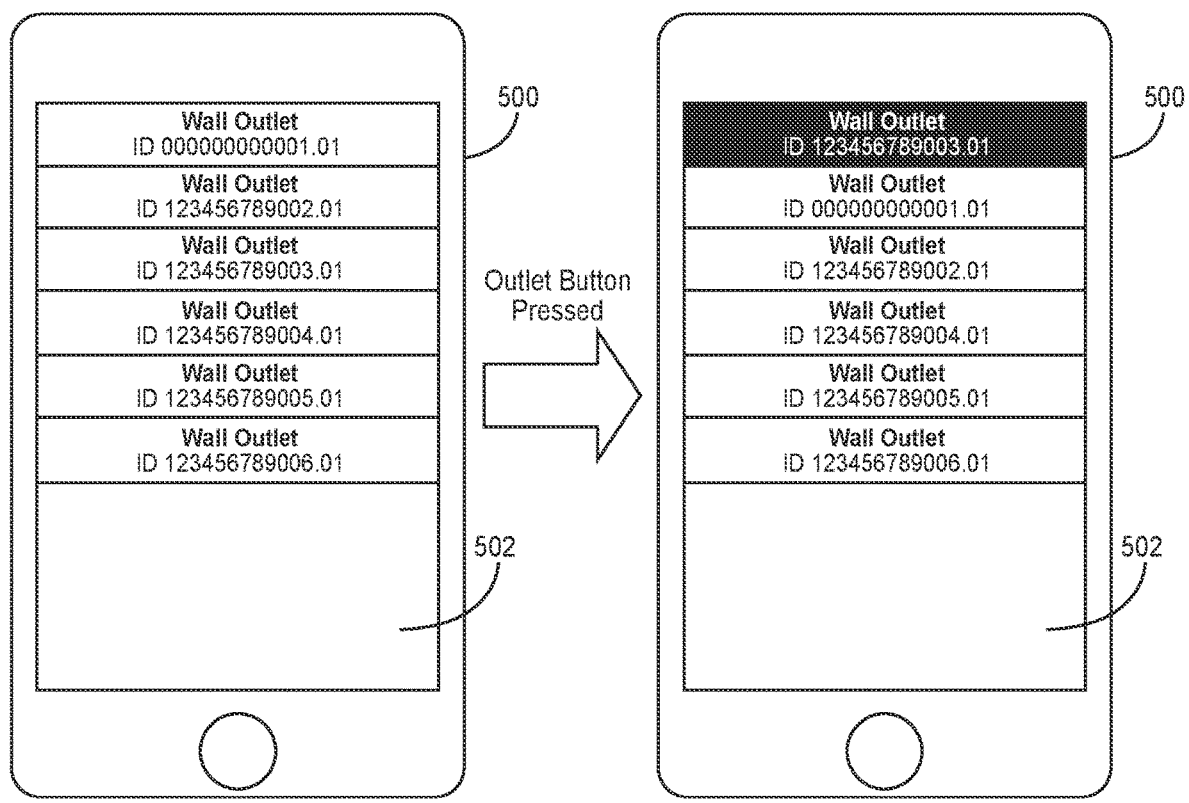
FIG. 5 is a diagram illustrating an exemplary embodiment of a human machine interface displaying information related to multiple outlets.

FIG. 5 is a drawing illustrating screens of a mobile device 500 showing a user interface in communication with either of the outlets, the central controller, or the content management server. For example, a mobile device 500 may communicate directly with the outlets through the low energy wireless interface on the outlets. Alternatively, the mobile device 500 may communicate with the central controller or the content management server through a low energy wireless interface, a TCP/IP connection, a web services interface such as SOAP, REST, over HTTP protocol, a hard wired connection, and the like. Further, in certain implementations, a wall outlet may include a switch that is accessible to a user. When the switch is turned on, either by pressing it down in the event the switch is a button or by toggling the switch, the wall outlet may be identified at the central collector, content management server, and displayed on the mobile device 500. Further, the outlets may also have LEDs located on a face plate or on the connector plug inserted into the wall outlet such that when a particular connector plug is selected at the central collector, content management server, or mobile device, the LED associated with the particular outlet may become illuminated.

In certain implementations, when a user selects the connector plug through a human machine interface on one of the central collector, the content management server, or a mobile device 500, such as HMI 502 on mobile device 500, an LED may be illuminated on the selected outlet or connector plug inserted into the selected outlet to aid the user in finding the desired connector plug. For example, a microcontroller in the outlet may receive a command from the central collector through a wireless interface on the connector plug to illuminate an LED on the selected outlet. When in a BLE or 802.15 direct connection with the mobile device 500, the wall outlet may also receive the command directly from the mobile device 500.

In a further implementation, the human machine interface 502 may display multiple user selectable fields where each field is associated with a different outlet in a network that implements managed connectivity. When a user selects one of the fields in the human machine interface 502, an LED on the connector plug associated with the user selectable field may become illuminated. For example, as illustrated, a user may select the user selectable field associated with the outlet with ID number 123456789003.01. When the user selects the field, the LED on the outlet associated with ID number 1234456789003.01 will be illuminated.

Figure 6:
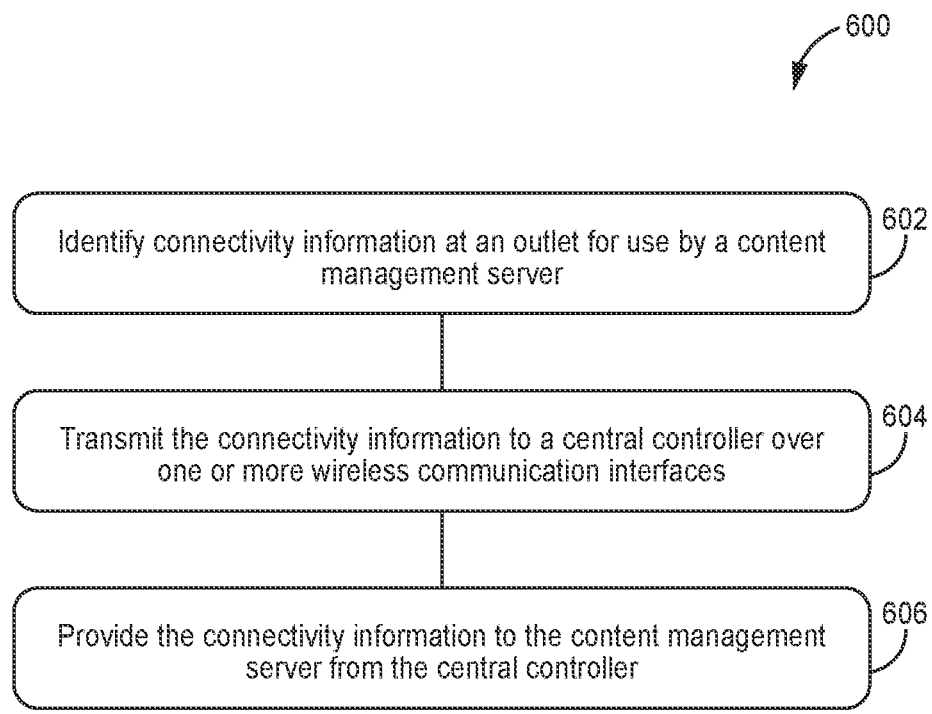
FIG. 6 is a flow diagram of one exemplary embodiment of a method for acquiring connectivity information from an outlet.

FIG. 6 is a flow diagram of a method 600 for communicating information from an outlet to a content management server through a wireless communication interface. To the extent that the embodiments of methods herein are described herein as being implemented in the systems described herein, it is to be understood that other embodiments can be implemented in other ways. The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

The method 600 proceeds at 602 where connectivity information is identified at an outlet for use by a content management server. For example, a plug may be inserted at an outlet. A SoC located at the outlet may identify the connectivity information stored in a memory device either in the outlet or in the plug connected to, e.g. a receptacle of, the outlet. Method 600 proceeds at 604, where the connectivity information is transmitted to a central controller over one or more wireless communication interfaces. For instance, the SoC located at the outlet transmits the connectivity information to a central controller through a low energy wireless interface. For example, the low energy wireless interface may transmit the information through a Bluetooth, BLE, or IEEE802.15.4 compliant wireless interface. In certain implementations, the central controller may be a general purpose computer. Alternatively, the central controller may be a dedicated central controlling device. Optionally, method 600 proceeds at 606, where the connectivity information is provided to the content management server from the central controller; as discussed above the content management server and the central controller may be one in the same. For example, after receiving the connectivity information from the outlets through a low energy wireless interface, a central controller may transmit the connectivity information to the content management server through a TCP/IP network, and/or through a web services interface such as SOAP, REST, over HTTP protocol. Thus, the content manager server receives the connectivity information from the outlet and other outlets and is able manage the connectivity of the outlets and plugs connected therein because of the information communicated through the low energy wireless interfaces.

An augmented reality (AR) device may be used with the networks described above, e.g. with respect to FIGS. 3 and 4. For pedagogical purposes, the AR device subsequently illustrated is implemented using intelligent eyeglasses. The AR device may be implemented in other ways, for example using another type of wearable AR device, or using a device with a screen (e.g. a tablet or smartphone) in a manner as would be used for Google Goggles®. When using the screen, an augmented reality overlay may be projected over or by a real image (viewed directly as with Google Glass® or captured by an image capture system as with Google Googles®). A real image means an image of one or more real objects. It is to be understood that any type of AR device can be used, including, without limitation, wearable devices (such as devices using 3D holographic-lenses) and non-wearable devices. Thus, it will be appreciated that the AR device may be used to in lieu of or may be the mobile device 500.

Google Glass® is an application for portable devices such as smart phones and tables that generates an augmented reality overlay over a captured real image captured by the portable device. Google Glass® is a product that implements mobile computing technology into a pair of eyeglasses such as a pair of glasses to provide "intelligent" glasses. The individual wearing the pair of intelligent eyeglasses may input information via voice commands that are received through a microphone on the intelligent eyeglasses. Information about outlet(s) may be displayed to a user, e.g. a technician. The technician can confirm or modify such data by, for example, a voice command that is received via a microphone of the intelligent eyeglasses and used to update a remote database (e.g. part of the content management server) and/or the data stored a the corresponding outlet.

Figure 7:
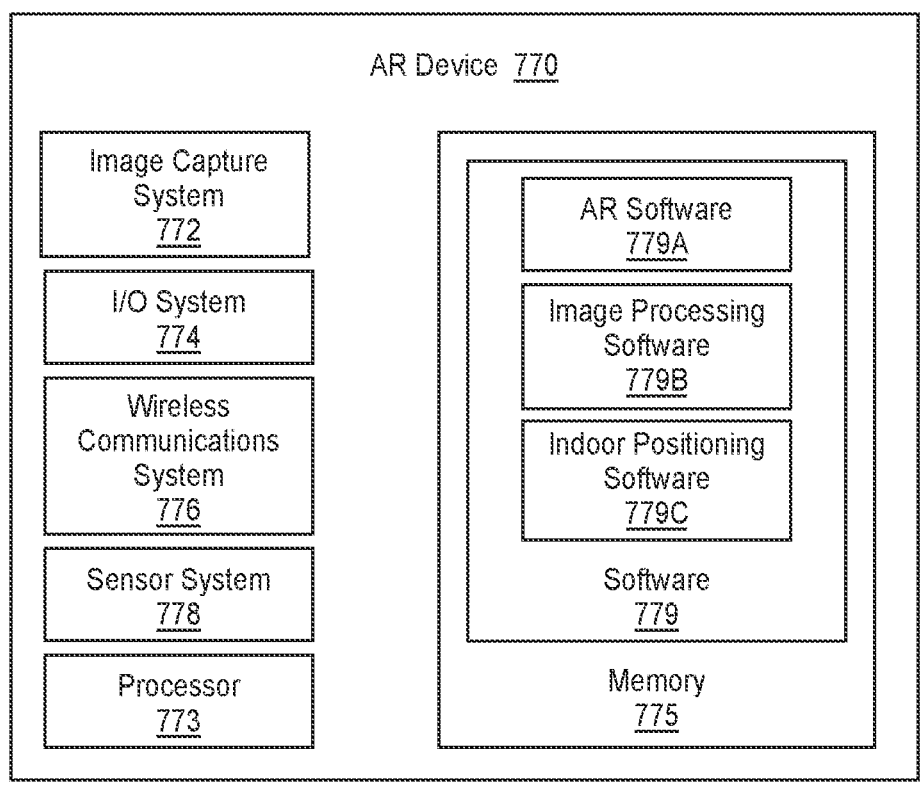
FIG. 7 illustrates a block diagram of one embodiment of an augmented reality device.

FIG. 7 illustrates a block diagram of one embodiment of an AR device 770. The AR device 770 comprises an image capture system 772, an input/output (I/O) system 774, a wireless communications system 776, at least one processor (processor) 773, and at least one memory (memory) 775. Each of the image capture system 772, the I/O system 774, the wireless communications system 776, and the at least one memory 775 are coupled to the at least one processor 773. Optionally, the AR device 770 includes a sensor system 778 coupled to the at least one processor 773.

The wireless communications system 776 may include communications system(s) to communicate over a local area network (e.g. an IEEE802.11 compliant communications system) and/or over a personal area network (e.g. an IEEE802.15.4 compliant, a Bluetooth, and/or BLE communications systems). The sensor system 779 may be a global navigation satellite system receiver and/or inertial sensors used to determine, e.g. possibly using the software 779, the location of the AR device 770.

The at least one processor 773 comprises processor circuitry which may include at least one of microcontroller(s), microprocessor(s), digital signal processor(s), gate array(s), and application specific integrated circuit(s). The at least one memory 775 comprises memory circuitry which may include at least one of random access memory, read only memory, Flash memory, magnetic memory such as hard drive(s), and optical memory such as optical disc(s) and optical read and/or writing devices.

The I/O system 774 includes a display system, e.g. a projection system, and optionally a speaker and/or a microphone. Using the display system, the AR device 770 is configured to render and display an augmented reality overlay image (or augmented reality overlay), e.g. that is superimposed over the user's view of the real word for example as used in Google Glass®. Alternatively, the display system may be a display, e.g. of a portable device for example used with Google Googles®.

The projection system, for example, may be a projector which projects an augmented reality overlay with a prism that directs the AR overlay onto the retina of the user, e.g. the wearer of the AR device 770. The AR overlay is effectively projected over a real image viewed with the eyes of the user of the AR device 770. The image capture system 772 is used to capture an image of what the user is current looking at with the AR device 770. The image capture system 772 may be one or more cameras. The AR device 770 may be configured to zoom in or out (either optically or digitally) when capturing images using the image capture system 772; such zooming may be facilitated by image processing software 779B. When the AR device 770 is a portable device with a display, rather than intelligent eyeglasses, the AR overlay is displayed over the real image captured by the image capture system 772.

The at least one processor 773 is programmable and executes software and/or firmware (collectively software 779), e.g. stored in the at least one memory 775. The software 779 comprises program instructions that are stored (or otherwise embodied) on an appropriate non-transitory storage medium or media, i.e. the at least one memory 775, from which at least a portion of the program instructions are read by the processor 773 for execution thereby. The software 779 is configured to cause the at least one processor 773 to carry out at least some of the operations described here as being performed by that AR device 770. Although the at least one memory 775 is shown in FIG. 7 as being included in the AR device 770, it is to be understood that at least a portion of the at least one memory 775 can be located remotely (for example, storage media that is accessible over a network such as for example the content management server 106) and/or can be removable memory media.

The software 779 comprises AR software 779A, image processing software 779B, and/or indoor-positioning software 779C. The AR software 779A is configured to render the AR overlay that is superimposed over the user's view of the real word. In this example, at least a part of the AR software 779A executes on the at least one processor 773. However, it is to be understood that at least a part of the AR software 779A can be implemented on a device other than the AR device 770 (for example, the content management server 106).

The image processing software 779B executes, at least in part, on the at least one processor 773 included in the AR device 770. However, it is to be understood that at least a part of the image processing software 779B can be implemented on a device other than the AR device 770 (for example, the content management server 106).

The image processing software 779B is configured to identify and decode an identifier that is associated with one or more outlets. For example, the image processing software 779B can be configured to capture the identifier even when it is part of a larger image.

The indoor-positioning software 779C is optional. The indoor-positions software is configured to determine the location of the AR device 770 within a map of a relevant site and the orientation of the AR device 770 (more specifically, the orientation of the image-capture device 770). Based upon the determined location and orientation (e.g. provided by the optional sensor system 778 and/or the wireless communications system 776 using an external personal area network positioning system), the indoor-positioning software 779C may determine which outlet(s) are expected to be within the field of view of the image capture system 772 and/or the AR device 770, and corresponding identifier(s) for the expected outlet(s). The indoor-positioning software 779C can then be used to identify outlet(s) in an image captured by the AR device 770 in lieu of using marker(s) of the outlet(s), can be used to verify the marker(s), or can be used to guide a user to a desired outlet.

Figure 8:
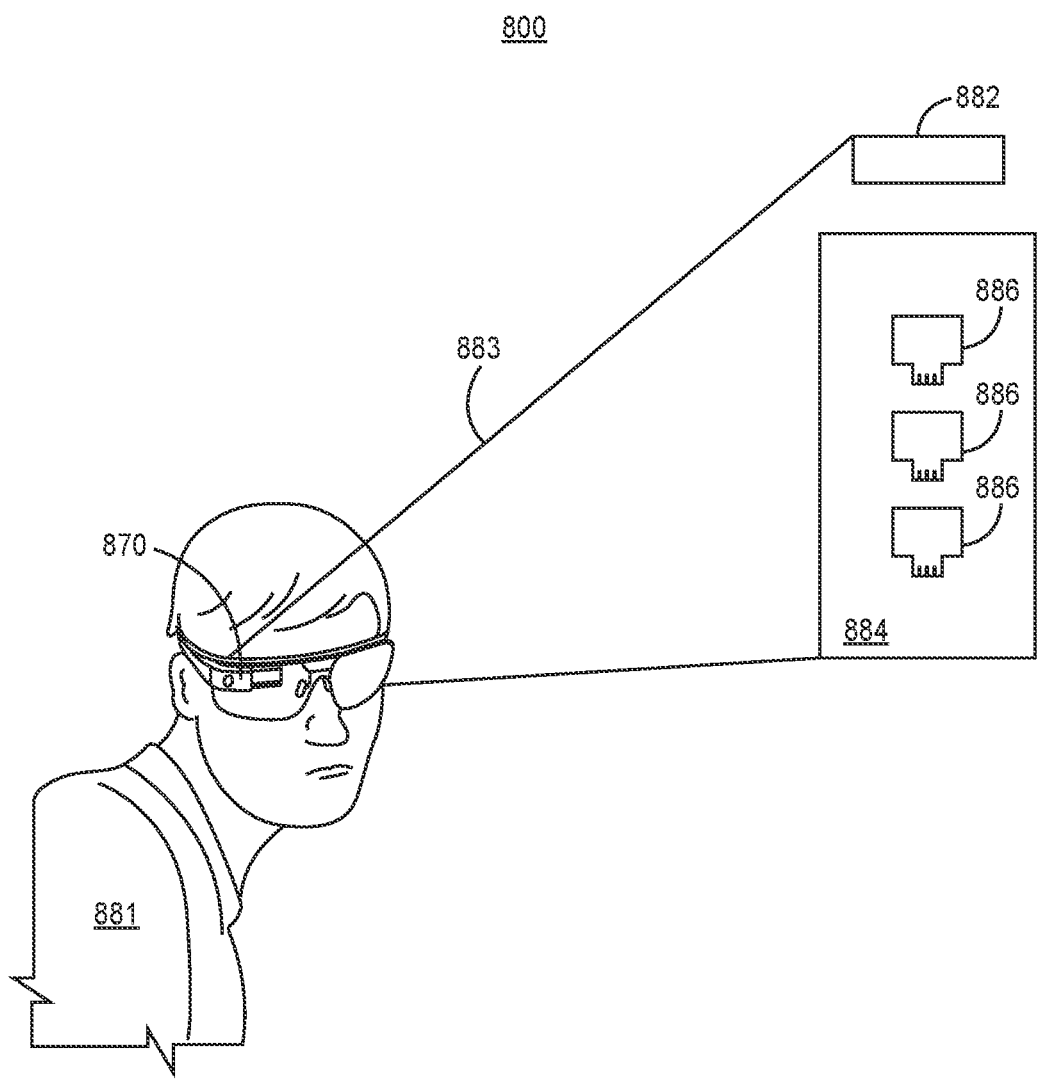
FIG. 8 illustrates one embodiment of a user utilizing an augmented reality device to identify and view information about an outlet

FIG. 8 illustrates one embodiment of a user utilizing an augmented reality device to identify and view information about an outlet 800. The user 881, e.g. a technician, wears an augmented reality device, augmented reality glasses 870, and views an outlet 884 having a marker 882 in the field of view 883 of the augmented reality glasses 870. The outlet has ports (or receptacles) 886 into which cables can be plugged. As will be subsequently illustrated the AR device displays (to the user wearing the AR device) information about the outlet 884.

Figure 9:
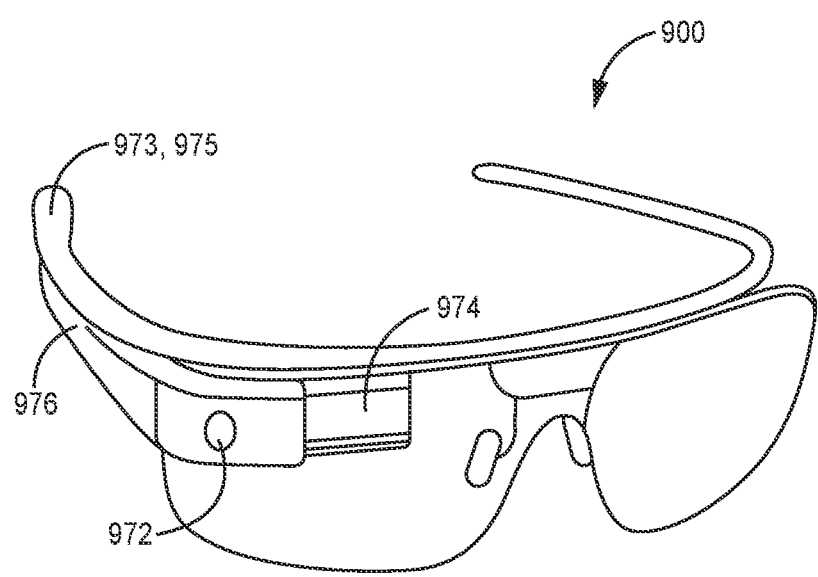
FIG. 9 illustrates one embodiment of augmented reality eye glasses.

FIG. 9 illustrates one embodiment of augmented reality eye glasses 900. The augmented reality glasses 900 include an I/O system 974 (e.g. as described above for the AR device 770). The augmented reality eyeglasses 900 may also include an image capture system 972 (e.g. a camera), at least one processor 973, at least one memory 975, software, and a wireless communications system 976 (e.g. as described above for the AR device 770).

Returning to FIG. 8, each outlet, for example, can have a unique identifier, e.g. displayed with the marker 882. For example, the unique identifier may be generated from one or more unique media access controller addresses of communications device(s) of the wireless communication interface 214 for a unique outlet, or other system identifier(s). The other identifier(s) can be generated from a unique serial number assigned to the outlet in a database, and/or can be generated, e.g. by the content management server 106. In one example, each marker 882 comprises a bar code, QR code, and/or text. Each marker 882 can be implemented, for example, using a printed adhesive label, an electronic display device (for example, a liquid crystal or E-ink display), and/or using one or more light emitting diodes (LEDs) that are strobed to encode an identifier (for example, using Morse code or another communications scheme). The marker 882 can be part of or placed by a corresponding outlet.

Returning to FIG. 7, in one implementation, the AR device 770 is configured to automatically detect and decode any identifiers in captured images, e.g. using image processing software 779B. For example, the image processing software 779B is configured to continuously scan for markers 882, and to digitally zoom in on the captured images of such markers 882. Alternatively the AR device 770 is configured to detect and decode any identifiers in a captured image including a marker 882 in response to an input from the user; for example, such detection and decoding may be in response to a user (a) selecting or activating a button displayed as a part of the user interface for the AR device 770 or (b) issuing a verbal command detected by a microphone of the AR device 770.

The AR device 770 and/or a remote system, such as the content management server 106, can use the decoded identifier to obtain information about the corresponding outlet(s). The remote system may be a dedicated server or a Cloud computing system. If a remote system is used to decode the identifier, the undecoded identifier is sent to the remote system by the AR device 770. If the remote system is used to obtain information about the corresponding outlet(s), the undecoded identifier or the information extracted from the decoded identifier (depending if the remote system decodes the identifier or not) is sent to the remote system by the AR device 770. The remote system then provides information about the corresponding outlet(s) to AR device 770. A central controller and the wireless communications system 776 may be used to facilitate such communications, e.g. by wireless local networking.

Optionally, the outlet and/or the remote system electronically store the identifier of a corresponding outlet, e.g. in the memory 208. Optionally, the AR device 770 can send its location to the remote system, e.g. the content management server 106, and receive from the remote system the identifier (and/or information—for example as subsequently described—about the corresponding outlet necessary to form a communications link between the outlet and the AR device 770).

Upon receiving the identifier, e.g. that has been decoded by the image processing software 779B, the software 779 can extract data, e.g. a media access controller address, service set identifier, password, and/or other data that permits the wireless communications system 776 to form a wireless communications link between the AR device 770 and the wall outlet. Alternatively, the wireless communications system 776 may transmit, e.g. by IEEE802.11 compliant communications, the identifier to a remote system, e.g. the content management server 106, and receive from the remote system such data that permits the wireless communications system 776 to form the communications link with the outlet corresponding to the identifier.

The communications link between the AR device 770 and the outlet may use, e.g. IEEE802.15.4 compliant, IEEE802.11 compliant, Bluetooth, or BLE communications. Upon forming a communications link between the AR device 770 and the outlet (e.g. in the AR device's field of view), the AR device 770 can obtain information about that particular outlet from the outlet and display such information to the user.

Also, alternatively, the outlet may communicate information about itself to a remote system, e.g. the content management server 106. The AR device 770 may display information (in the form of an augmented reality overlay) about the outlet (obtained directly from the outlet and/or the remote system) to the user using the display system of the I/O system 774. Optionally, the AR device 770 may additionally or alternatively form, e.g. an IEEE802.11 compliant, communications link with the remote system, e.g. the content server 106; the remote system can provide additional information related to a specific outlet (e.g. about cables plugged into receptacles of the outlet, about hardware connected by the cables to the receptacles of the outlet, about a corresponding distribution frame, PoE information, virtual local area network information, and/or other information about the outlet and components coupled to the outlet) which may not be stored in the corresponding outlet.

Figure 10:
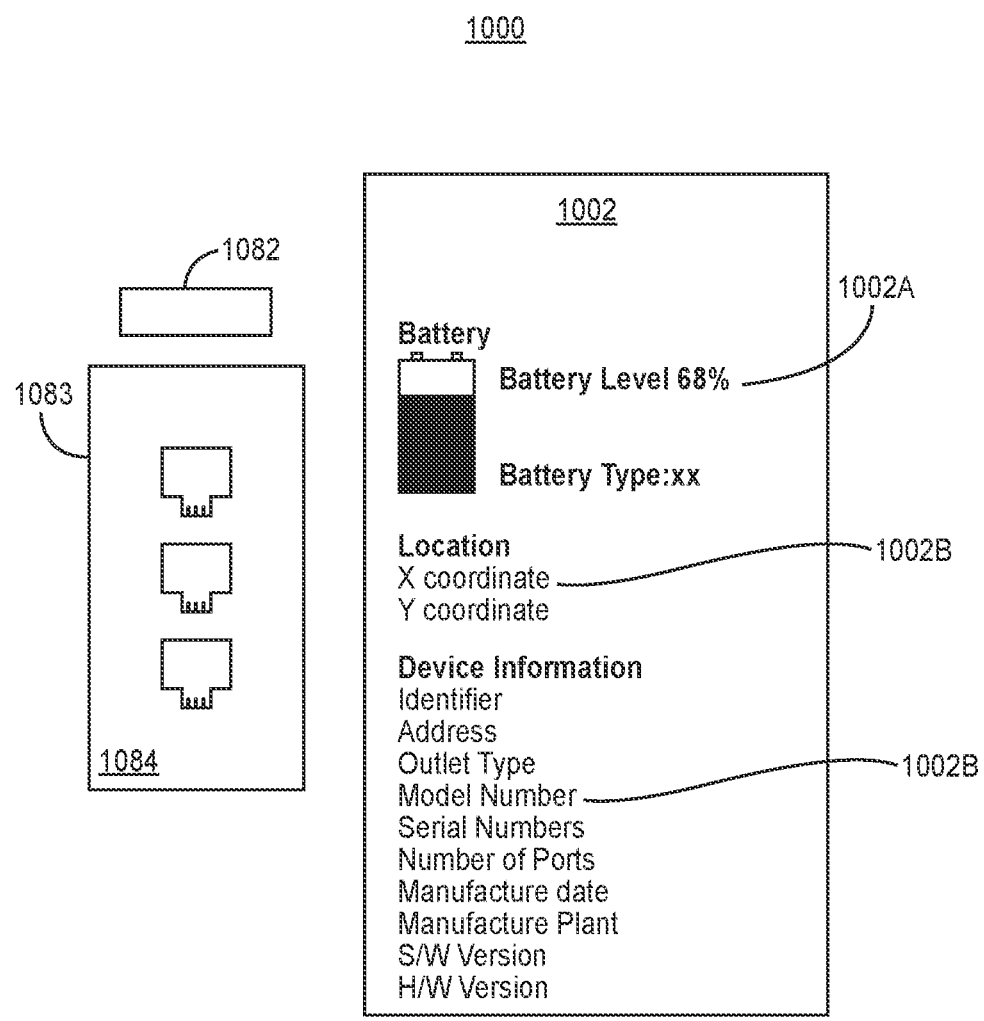
FIG. 10 is an illustration of one embodiment of a view by a user of an outlet, a marker, and an augmented reality projection.

FIG. 10 is an illustration of one embodiment of a view by a user of an outlet, a marker, and an augmented reality overlay 1000. The outlet 1084 and marker 1082 are on a surface of a structure, e.g. a wall or an equipment enclosure. For pedagogical reasons, the structure will be subsequently illustrated as wall. The illustrated images of the outlet 1084 and marker 1082 on a wall 1083 are images of real objects. The AR overlay 1002 is an image generated by the AR device 770 and/or the remote system, and superimposed on the image of a real object, e.g. the image of the wall 1083. For pedagogical purposes, the AR overlay 1002 of FIG. 10 is illustrated as show outlet related information such as outlet power source information 1002A. The power source 202 is described above, and for pedagogical reasons is illustrated as a battery. The outlet power source information 1002A shown in FIG. 10 illustrates battery level (by an amount and color). For example, a color green can be used to show the battery level is above a first threshold level, e.g. seventy percent; a red color can be used to show the battery level is below a second threshold level, e.g. thirty percent; and/or an amber color can be used to show that the battery level is between the first and second thresholds. The outlet related information may also include outlet location 1002, and/or outlet specifications 1002C, e.g. outlet type, number of receptacles in the outlet, outlet date of manufacture, outlet manufacturer, manufacturing plant where the outlet was made, outlet software version, and/or outlet hardware version.

Figure 11:
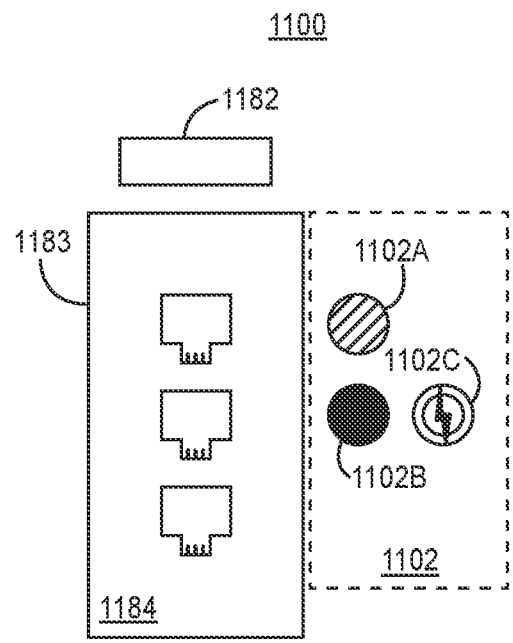
FIG. 11 is an illustration of another embodiment of a view by a user of an outlet, a marker and an augmented reality projection.

FIG. 11 is an illustration of another embodiment of a view by a user of an outlet, a marker, and an augmented reality overlay 1100. The illustrated outlet 1184 and the marker 1182 on the wall 1183 are again images of real objects. The augmented reality overlay 1102 is superimposed on the images of the real objects, e.g. on the image of the wall 1183. The illustrated border of the augmented reality projection 1102 is shown only to identify the augmented reality overlay 1102, and would not be seen in actuality by a user. For pedagogical purposes, the augmented reality overlay 1102 of FIG. 11 is illustrated to show port (or receptacle) information. A first indicator 1102A denotes that a first receptacle (adjacent to the first indicator) may have a problem, e.g. may not be operational. The second indicator 1102B indicates that a second, unused receptacle (adjacent to the second indicator) has a functional or working data connection. The third indicator 1102C indicates that the second receptacle is powered by power over Ethernet (PoE) from a remote source coupled to the second receptacle.

Figure 12:
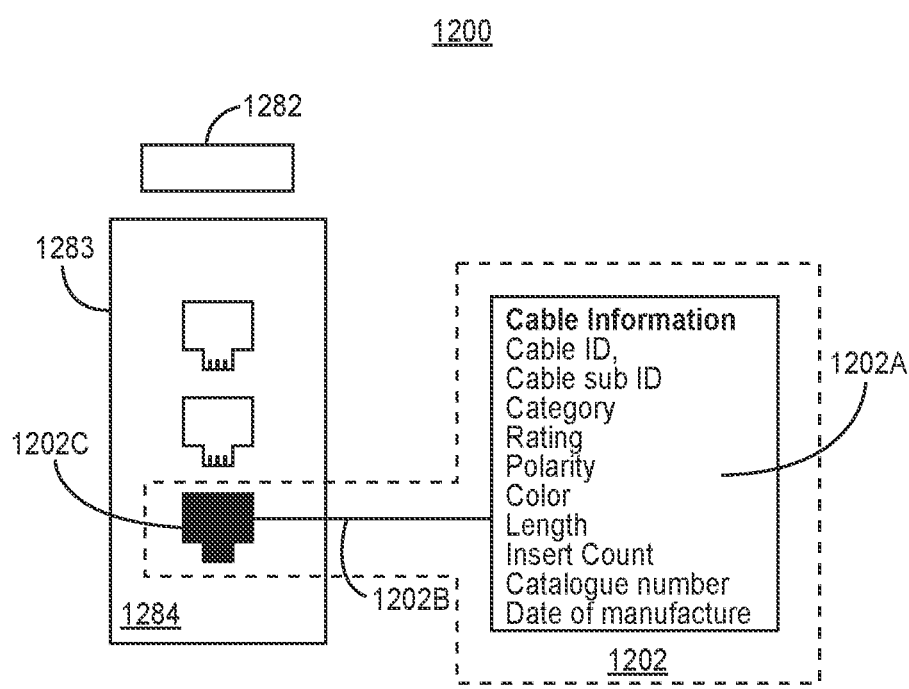
FIG. 12 is an illustration of yet another embodiment of a view by a user of an outlet, a marker and an augmented reality projection.

FIG. 12 is an illustration of yet another embodiment of a view by a user of an outlet, a marker, and an augmented reality projection 1200. The outlet 1284 and marker 1282 on a wall 1283 are again images of real objects. The augmented reality overlay 1202 is superimposed on the images of the real objects, e.g. over the outlet 1284 and the wall 1283. For example, a first indicator 1202C is superimposed over a corresponding receptacle. The second indicator 1202A may be superimposed over the wall 1283. The illustrated border of the augmented reality overlay 1202 is shown only to identify the augmented reality overlay 1202, and need is not part of the augmented reality overlay 1202.

For pedagogical purposes, the augmented reality projection 1202 of FIG. 12 is illustrated to show port (or receptacle) usage information. The first indicator 1202C over a corresponding real receptacle denotes that an unused, third receptacle (covered by the indicator) has a functional or working data connection. The second indicator 1202A provides information about the cable connected to the third receptacle; such cable information may include a cable identifier, a cable subidentifier (e.g. identifying cable end), cable category (e.g. Cat5, Cat 6 Cat 6A, Cat 7, Cat 8, single mode, or multimode), cable rating (e.g. unshielded, shielded F/UTP, Shielded S/FTP, OM1, OM2, OM3, or OM4), cable polarity (e.g. 568A, 568B, A to A, or A to B), cable length, cable insertion count, catalog number, and/or date of cable manufacture. The third indicator 1202B is an optional connection line between the first indicator 1202A and the second indicator 1202C to identify that the information of the second indicator 1202C corresponds to a cable inserted into the third receptacle. The cable information can be obtained from a remote system, e.g. the content management server 106, or directly from the outlet.

The outlet can include mechanical switches and/or electrical circuitry (which may be part of or connected to the SoC 210) to detect when cables are inserted and/or removed from a receptacle in the outlet, and to obtain information about the cable (e.g. from a data system of a smart cable). Further, the AR device 770 can show in real time when a cable is plugged into and unplugged from a receptacle of an outlet by changing the color of receptacle or of an icon next to the receptacle, and/or displaying information about the cable next to the receptacle. The outlet generates information indicating such plugging and unplugging of cables, and shares that information with the AR device 770 and/or a remote system, e.g. the content management server 106. The AR device 770 may receive such information from the content management server 106, or directly from the outlet. Such information shared with the AR device 770 is used to cause the AR device to display visual indicator(s) of changing port status and/or cable information in an augmented reality projection.

Optionally, receptacle status and/or cable information illustrated above may be selectively obtained by a user, e.g. a technician, by their selecting an outlet and one or more receptacles of the outlet. Such selection may be achieved by vocal command, e.g. into the microphone of the AR device 770, by touching a portion of a screen or viewed image corresponding to the desired outlet and/or the receptacle(s). For example, the image processing software 779B may also be configured to identify gestures that are performed by the user of the AR device 1312 (such as "touching" particular objects (virtual or real) displayed in the user's field of view.

The augmented reality device 770 can also be used to verify successful installation of an outlet and corresponding marker. Upon installation, of the outlet and marker, the AR device 770 would attempt to form a communications link with the newly installed outlet. If the marker includes information to form a personal area communications link, the AR device 770 will extract such information (as described above) and form a personal area communications link with the outlet. The AR device 770 will indicate, e.g. with an error message, that the marker is incorrect when the AR device 770 is unable to extract data with information to form a communications link between the corresponding outlet and the AR device 770. Optionally, the user, e.g. the installer, can use the AR device 770 to enter the location of the outlet, e.g. in latitude, longitude, and altitude or building, floor, room, and room location. Then, the user, e.g. installer, using the AR device 770 can use the AR device to verify operation of the outlet, e.g. detection of cable insertion and removal from receptacle(s), receptacle status, battery status, and/or information about cable(s) inserted into receptacle(s) of the outlet.

Figure 13:
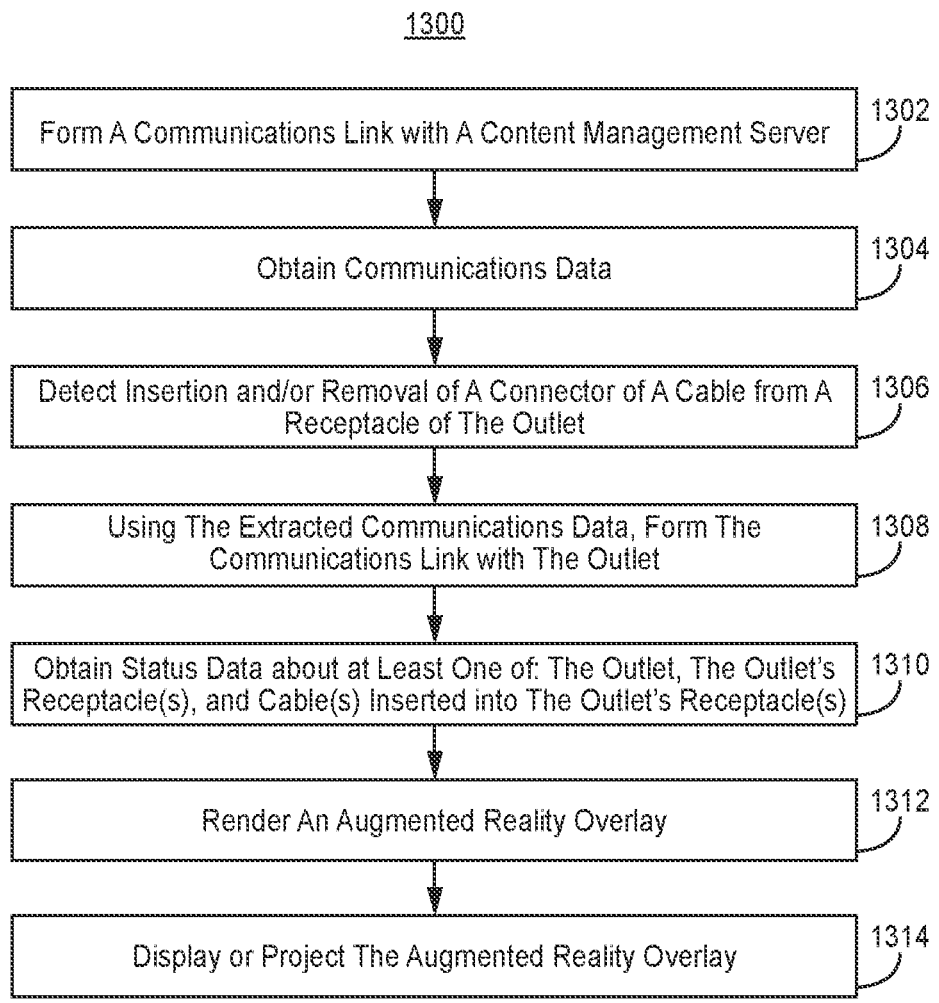
FIG. 13 comprises a flow chart illustrating one exemplary embodiment of a method 1300 of using an AR device to assist with identifying information about an outlet.

FIG. 13 comprises a flow chart illustrating one exemplary embodiment of a method 1300 of using an AR device to assist with identifying information about an outlet. Such information, for example, may be information about the outlet, its receptacle(s), and cable(s) inserted into the receptacle(s). The exemplary embodiment of method 1300 shown in FIG. 13 is described here as being implemented using the AR device, an outlet, and/or a remote system.

To the extent that the embodiments of methods herein are described herein as being implemented in the systems described herein, it is to be understood that other embodiments can be implemented in other ways. The blocks of the flow diagram shown in FIG. 13 have been arranged in a generally sequential manner for ease of explanation; however, it is to be understood that this arrangement is merely exemplary, and it should be recognized that the processing associated with method 1300 (and the blocks shown in FIG. 13) can occur in a different order (for example, where at least some of the processing associated with the blocks is performed in parallel and/or in an event-driven manner). Also, most standard exception handling is not described for ease of explanation; however, it is to be understood that method 1300 can and typically would include such exception handling.

Optionally, in block 1302, form a communications link with a content management server. In block 1304, obtain, at an augmented reality device, communications data configured to be used to form communications link with the outlet. Such communications data, e.g. a media access controller address, service set identifier, password, and/or other data that permits the wireless communications system of the AR device to form a wireless communications link with a communications system of the outlet.

In one embodiment, block 1304 may be implemented by detecting a marker (e.g. by detecting an identifier on a marker that is by or on an outlet) in an image captured by an AR device. The AR device is configured so that the detecting the identifier in the images captured by the AR device automatically or in response to an input from the user. For pedagogical reasons, the embodiment will be described by having the identifier detected in response to an input from the user. The user can manipulate the AR device so as to position the marker in the field of view of an image capture system, zoom in so that the details of the identifier of the marker are visible with sufficient resolution, and then select or activate a button in order to cause the image processing software to detect and decode the identifier. Where a marker comprises a barcode or QR code, the image processing software is configured with barcode or QR-code scanning functionality suitable for detecting, identifying, and decoding bar or QR codes that are within the captured images. Then, the communications data is extracted from an image of the marker, e.g. by the image processing software 779C. Such communications data, e.g. a media access controller address, service set identifier, password, and/or other data, permits the wireless communications system of the AR device to form a wireless communications link with the wireless communications system of the outlet.

Alternatively, the AR device can ascertain its location when it is proximate to an outlet, and transmit the location data to a remote system, e.g. a content media server. For example, a user can select or activate a button in order to cause the AR device to transmit its location to the content media server. The content media server then can determine, e.g. from a database, the identifier or communications data of the corresponding outlet. The content media server then transmits the identifier or communications data to the AR device. If it receives the identifier, e.g. from the content media server, the AR device then extracts the communications data. Then, the AR device utilizes the received or extracted communications data to form a communications link with the outlet as described above. Optionally, in block 1306, detect, with the outlet, an insertion of a connector of a cable into and/or removal of the connector of the cable from a receptacle of the outlet, and send such data to at least one of the AR device and the content management server.

In block 1308, using the communications data, form the communications link between the outlet and the AR device. In block 1310, obtain, from the outlet, status data about at least one of: the outlet, the outlet's receptacle(s), and cable(s) inserted into the outlet's receptacle(s). Such data may be data described elsewhere herein. Optionally, such data may be obtained by a user, e.g. a technician, by selecting an outlet, outlet receptacle(s), and/or corresponding cable(s) of the outlet. Such selection may be achieved by vocal command, e.g. into the microphone of the AR device, by touching a portion of a screen or viewed image corresponding to the desired outlet and/or the receptacle(s). For example, the image processing software is also configured to identify gestures that are performed by the user of the AR device (such as "touching" particular objects (virtual or real) displayed in the user's field of view. Further, such data may be sourced by the outlet or a remote system as described above. Optionally, block 1310 further comprises obtaining, from the at least one of the outlet and the content management server, information about at least one of: the outlet, the outlet's receptacle(s), and cable(s) inserted into the outlet's receptacle(s). Optionally, block 1310 further compromises the AR device obtaining status data from at least one of the outlet and the content media server.

In block 1312, render with the AR device, e.g. using the AR software 779A, an augmented reality overlay including and/or indicative of the status data obtained in block 1308. In block 1314 display or project the augmented reality overlay over or by a real image, e.g. captured by an image capture system or directly viewed, of the outlet. The rendered image may, as described above, be projected with intelligent eyeglasses or displayed on a screen of a device. Optionally, if block 1306 is performed, then block 1310 when rendering, with the AR device, the augmented reality overlay include an indication the insertion and/or removal the connector of the cable.

EXAMPLE EMBODIMENTS

Example 1 includes a system for providing connectivity management, the system comprising: a content management server configured to manage connectivity for a network; one or more central controllers configured to collect connectivity information for at least a portion of the network for use by the content management server; and at least one outlet having one or more ports for receiving one or more plugs, wherein connectivity information is communicated between the outlet and the central controller through one or more wireless communication interface.

Example 2 includes the system of Example 1, wherein the one or more wireless communication interfaces are at least one of: a Bluetooth network interface; Bluetooth Low Energy network interface; and an IEEE802.15.4 compliant network interface.

Example 3 includes the system of any of Examples 1-2, wherein the outlet comprises an outlet microcontroller, the outlet microcontroller comprising: a memory that stores connectivity information about the outlet; and a system on chip comprising a processing unit and a wireless communication interface in the one or more wireless communication interfaces.

Example 4 includes the system of Example 3, wherein the outlet further comprises: contacts for connecting to the one or more plug; at least one LED, wherein the at least one LED is driven by the processing unit.

Example 5 includes the system of Example 4, wherein the processing unit drives the at least one LED based on instructions received from the one or more central controllers.

Example 6 includes the system of any of Examples 4-5, wherein the content management server directs the at least one LED to be illuminated when a user selects a reference to an outlet in the at least one outlet that is associated with the at least one LED, wherein the reference is displayed on a human machine interface connected to the content management server.

Example 7 includes the system of any of Examples 3-6, wherein the processing unit receives connectivity information from the one or more plugs, wherein the processing unit transmits the connectivity information to the central collector through the wireless communication interface.

Example 8 includes the system of any of Examples 3-7, wherein the outlet microcontroller receives power from at least one of: a battery; power mains; and power over Ethernet.

Example 9 includes the system of any of Examples 3-8, wherein the outlet microcontroller indicates to the one or more central controllers that a plug is inserted into the outlet.

Example 10 includes the system of any of Examples 1-9, wherein the outlet provides connectivity information in response to a request from the one or more central controllers.

Example 11 includes the system of any of Examples 1-10, wherein a transmission through the one or more wireless communication interfaces has a unique address that identifies one of the outlet and the plurality of connector plugs that produced the transmission.

Example 12 includes the system of any of Examples 1-11, wherein the one or more central controllers is at least one of: a personal computer; a dedicated central controlling device; a part of the content management server; and a mobile device.

Example 13 includes the system of any of Examples 1-12, wherein the one or more central controllers comprises: a collection wireless communication interface for receiving the connectivity information that is transmitted through the one or more wireless communication interfaces in the at least one outlet; a TCP/IP interface to provide the connectivity information to the content management server through a TCP/IP network; and a web services interface.

Example 14 includes the system of any of Examples 1-13, wherein the content management server balances the number of outlets in the at least one outlet that are in communication with each central controller in the one or more central controllers.

Example 15 includes the system of Example 14, wherein the content management server balances the number of outlets in communication with each central controller based on at least one of: a received signal strength indication; and location of the at least one outlet.

Example 16 includes the system of any of Examples 1-15, wherein the at least one outlet comprises a switch that directs the content management server to provide a user with identifying information for the at least one outlet when the switch is turned on.

Example 17 includes an outlet for providing connectivity information, the outlet comprising: one or more ports for receiving one or more plugs; an outlet microcontroller, the outlet microcontroller comprising: a memory that stores connectivity information about the outlet; and a system on chip comprising a processing unit and one or more wireless communication interfaces, wherein, the processing unit transmits the connectivity information regarding the outlet and the one or more plugs to a central controller through the one or more wireless communication interfaces.

Example 18 includes the outlet of Example 17, wherein the one or more wireless communication interfaces are at least one of: a Bluetooth network interface; Bluetooth low energy network interface; and an IEEE802.15.4 compliant network interface.

Example 19 includes the outlet of any of Examples 17-18, wherein the outlet further comprises at least one LED, wherein the at least one LED is driven by the processing unit.

Example 20 includes the outlet of Example 19, wherein the processing unit drives the at least one LED based on instructions received from the central controller.

Example 21 includes the outlet of any of Examples 17-20, wherein the processing unit receives connectivity information from the one or more plugs, wherein the processing unit transmits the connectivity information to the central collector through the wireless communication interface.

Example 22 includes the outlet of any of Examples 17-21, wherein the outlet microcontroller receives power from at least one of: a battery; power mains; and power over Ethernet.

Example 23 includes the outlet of any of Examples 17-22, wherein the outlet microcontroller indicates to the central controller that a plug is inserted into the outlet.

Example 24 includes the outlet of any of Examples 17-23, wherein the outlet microcontroller provides connectivity information in response to a request from the central controller.

Example 25 includes a method for communicating connectivity information, the method comprising: identifying connectivity information at an outlet for use by a content management server; transmitting the connectivity information to a central controller over one or more wireless communication interfaces; providing the connectivity information to the content management server from the central controller.

Example 26 includes the method of Example 25, wherein the one or more wireless communication interfaces are at least one of: a Bluetooth network interface; Bluetooth low energy network interface; and an IEEE802.15.4 compliant network interface.

Example 27 includes the method of any of Examples 25-26, further comprising driving at least one LED at the outlet based on instructions received from the central controller.

Example 28 includes the method of Example 27, wherein the content management server directs the at least one LED to be illuminated when a user selects a reference to an outlet that is associated with the at least one LED, wherein the reference is displayed on a human machine interface connected to the content management server.

Example 29 includes the method of any of Examples 25-28, wherein the outlet indicates to the central controller that a plug is inserted into the outlet.

Example 30 includes the method of any of Examples 25-29, wherein the outlet provides connectivity information in response to a request from the central controller.

Example 31 includes the method of any of Examples 25-30, wherein a transmission through the one or more wireless communication interfaces has a unique address that identifies the outlet as the source of the transmission.

Example 32 includes the method of any of Examples 25-31, further comprising balancing the number of outlets in communication with the central controller in comparison to other central controllers in communication with the content management server.

Example 33 includes the method of Example 32, wherein balancing the number of outlets is based on at least one of: a received signal strength indication for outlets in communication with the central controllers that are managed by the content management server; and location of the outlets in relation to the central controllers.

Example 34 includes the method of any of Examples 25-33, further comprising providing a user with identifying information for the outlet when a switch on the outlet is actuated.

Example 35 includes the method of any of Examples 25-34, further comprising directly connecting the outlet to a mobile device through the one or more wireless communication interfaces.

Example 36 includes a method, comprising: obtaining, at an augmented reality device, communications data configured to be used to form a communications link with an outlet; forming, using the communications data, the communications link between the outlet and the augmented reality device; obtaining status data about at least one of: the outlet, at least one receptacle of the outlet, and at least one cable inserted into a receptacle of the outlet; using the augmented reality device, rendering an augmented reality overlay that at least one of: includes the status data and is indicative of the status data; and displaying or projecting, with the augmented reality device, the augmented reality overlay at least one of over an image of at least one real object and by the image of the at least one real object.

Example 37 includes the method of Example 36, wherein obtaining status data about the receptacle comprises obtaining information about at least one of: whether a cable is inserted into the receptacle and information about a cable inserted into the receptacle.

Example 38 includes the method of any of Examples 36-37, wherein obtaining status data comprises selecting at least one of: an outlet, and at least one receptacle of the outlet.

Example 39 includes the method of any of Examples 36-38, further comprising: forming a communications link with a content management server; and wherein obtaining status data comprises obtaining status data from at least one of the outlet and the content management server.

Example 40 includes the method of any of Examples 36-39, further comprising detecting at least one of: insertion of a connector of a cable from a receptacle of the outlet and removal of the connector of the cable from the receptacle of the outlet, where the status data includes information about detection of the at least one of the insertion and the removal.

Example 41 includes the method of Example 40, further comprising: forming a communications link with a content management server; and sending information, to the content management server, about the detection of the at least one of the insertion and the removal.

Example 42 includes the method of any of Examples 36-41, wherein obtaining the communications data comprises: detecting a marker on or by an outlet in an image captured by an augmented reality device; and extracting, from an image of the marker, communications data configured to be used to form a communications link with the outlet.

Example 43 includes the method of any of Examples 36-42, wherein obtaining the communications data comprises: forming a communications link with a content management server; and obtaining the communications data from the content management server.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A method, comprising:
 obtaining, at an augmented reality device, communications data configured to be used to form a communications link with an outlet, wherein the outlet comprises one or more connector receptacles, wherein each connector receptacle is configured to be connected to a connector plug of a cable;
 forming, using the communications data, the communications link between the outlet and the augmented reality device;
 obtaining, from the outlet, status data about at least one of: the outlet, at least one connector receptacle of the outlet and at least one cable inserted into a connector receptacle of the outlet;
 using the augmented reality device, rendering an augmented reality overlay that at least one of: includes the status data obtained from the outlet and is indicative of the status data obtained from the outlet; and
 displaying or projecting, with the augmented reality device, the augmented reality overlay at least one of over an image of at least one real object and by the image of the at least one real object.

2. The method of claim 1, wherein obtaining the status data about the connector receptacle comprises obtaining information about at least one of: whether the cable is inserted into the connector receptacle and the cable inserted into the connector receptacle.

3. The method of claim 1, wherein obtaining the status data comprises selecting at least one of: the outlet, and the at least one connector receptacle of the outlet.

4. The method of claim 1, further comprising:
 forming another communications link with a content management server;
 wherein obtaining the status data comprises obtaining the status data from at least one of the outlet and the content management server.

5. The method of claim 1, further comprising detecting at least one of: insertion of the connector plug of the cable into a connector receptacle of the outlet and removal of the connector plug of the cable from the connector receptacle of the outlet, where the status data includes information about detection of the at least one of the insertion of: the connector plug of the cable from the connector receptacle of the outlet and the removal of the connector plug of the cable from the connector receptacle of the outlet.

6. The method of claim 5, further comprising:
 forming another communications link with a content management server; and
 sending the information, to the content management server, about the detection of the at least one of: the insertion of the connector plug of the cable from the connector receptacle of the outlet and the removal of the connector plug of the cable from the connector receptacle of the outlet.

7. The method of claim 1, wherein obtaining the communications data comprises:
 detecting a marker on or by the outlet in an image captured by the augmented reality device; and
 extracting, from an image of the marker, the communications data configured to be used to form the communications link with the outlet.

8. The method of claim 1, wherein obtaining the communications data comprises:
 forming another communications link with a content management server; and
 obtaining the communications data from the content management server.

9. A program product comprising a processor readable medium on which program instructions are embodied, wherein the program instructions are configured, when executed by at least one programmable processor of an augmented reality device, to cause the at least one programmable processor to:
 obtain communications data configured to be used to form a communications link with an outlet, wherein the outlet comprises one or more connector receptacles, wherein each connector receptacle is configured to be connected to a connector plug of a cable;

form, using the communications data, the communications link between the outlet and the augmented reality device;

obtain, from the outlet, status data about at least one of: the outlet, at least one connector receptacle of the outlet, and at least one cable inserted into a connector receptacle of the outlet; and cause rendering of an augmented reality overlay that at least one of: includes the status data obtained from the outlet and is indicative of the status data obtained from the outlet;

wherein the augmented reality overlay is configured to be displayed or projected, by the augmented reality device, at least one of over an image of at least one real object and by the image of the at least one real object.

10. The program product of claim 9, wherein obtain the status data about the connector receptacle comprises obtain information about at least one of: whether a cable is inserted into the connector receptacle and the cable inserted into the connector receptacle.

11. The program product of claim 9, wherein obtain the status data comprises select at least one of: the outlet, and the at least one connector receptacle of the outlet.

12. The program product of claim 9, wherein the program instructions are configured, when executed by the at least one programmable processor, to further cause the at least one programmable processor to form another communications link with a content management server;

wherein obtaining the status data comprises obtaining the status data from at least one of the outlet and the content management server.

13. The program product of claim 9, wherein the program instructions are configured, when executed by the at least one programmable processor, to further cause the at least one programmable processor to detect at least one of: insertion of a connector plug of a cable into a connector receptacle of the outlet and removal of the connector plug of the cable from the connector receptacle of the outlet, where the status data includes information about detection of the at least one of: the insertion of the connector plug of the cable from the connector receptacle of the outlet and the removal of the connector plug of the cable from the connector receptacle of the outlet.

14. The program product of claim 13, wherein the program instructions are configured, when executed by at least one programmable processor, to further cause the at least one programmable processor to:

form another communications link with a content management server; and send the information, to the content management server, about the detection of the at least one of: the insertion of the connector plug of the cable from the connector receptacle of the outlet and the removal of the connector plug of the cable from the connector receptacle of the outlet.

15. The program product of claim 9, wherein obtain the communications data comprises:

detect a marker on or by the outlet in an image captured by the augmented reality device; and extract, from an image of the marker, the communications data configured to be used to form the communications link with the outlet.

16. An augmented reality device, comprising:
image capture circuitry;
a wireless communications system; and
processor circuitry coupled to the image capture circuitry and the communications system, and configured to:

obtain communications data configured to be used to form a communications link with an outlet, wherein the outlet comprises one or more connector receptacles, wherein each connector receptacle is configured to be connected to a connector plug of a cable;

form, using the communications data and the wireless communications system, the communications link between the outlet and the augmented reality device;

obtain, from the outlet, status data about at least one of: the outlet, at least one connector receptacle of the outlet, and at least one cable inserted into a connector receptacle of the outlet; and cause rendering of an augmented reality overlay that at least one of:

includes the status data obtained from the outlet and is indicative of the status data obtained from the outlet;

wherein the augmented reality overlay is configured to be displayed or projected at least one of over an image of at least one real object and by the image of the at least one real object.

17. The augmented reality device of claim 16, wherein obtaining the status data about the connector receptacle comprises obtaining information about at least one of: whether a cable is inserted into the connector receptacle and the cable inserted into the connector receptacle.

18. The augmented reality device of claim 16, wherein obtaining the status data comprises selecting at least one of: the outlet, and the at least one connector receptacle of the outlet.

19. The augmented reality device of claim 16, wherein the processor circuitry is further configured to:

forming another communications link with a content management server;

wherein obtaining the status data comprises obtaining the status data from at least one of the outlet and the content management server.

20. The augmented reality device of claim 16, further comprising detecting (1306) at least one of: insertion of a connector plug of a cable into a connector receptacle of the outlet and removal of the connector plug of the cable from the connector receptacle of the outlet, where the status data includes information about detection of the at least one of the insertion of: the connector plug of the cable from the connector receptacle of the outlet and the removal of the connector plug of the cable from the connector receptacle of the outlet.

21. The augmented reality device of claim 20, further comprising:

forming another communications link with a content management server; and sending the information, to the content management server, about the detection of the at least one of: the insertion of the connector plug of the cable from the connector receptacle of the outlet and the removal of the connector plug of the cable from the connector receptacle of the outlet.

22. The augmented reality device of claim 16, wherein obtaining the communications data comprises:

detecting a marker on or by the outlet in an image captured by the augmented reality device; and extracting, from an image of the marker, the communications data configured to be used to form the communications link with the outlet.

23. The augmented reality device of claim 16, wherein obtaining the communications data comprises:
   forming another communications link with a content management server; and
   obtaining the communications data from the content management server.

\* \* \* \* \*